US006328457B1

(12) United States Patent
Huang

(10) Patent No.: US 6,328,457 B1
(45) Date of Patent: Dec. 11, 2001

(54) COMBO TYPE GARDEN LAMP STRUCTURE

(76) Inventor: Ming Hsien Huang, No. 2, Lane 65, Chang Kong Road, Hsinchu (TW)

(*) Notice: Subject to any disclaimer, the term of this patent is extended or adjusted under 35 U.S.C. 154(b) by 0 days.

(21) Appl. No.: 09/504,836

(22) Filed: Feb. 16, 2000

(51) Int. Cl.[7] .............................. G06F 13/00; G06F 3/00

(52) U.S. Cl. .......................... 362/353; 362/431; 362/806; 362/363; 362/226

(58) Field of Search .................................... 362/353, 249, 362/363, 431, 806

(56) References Cited

U.S. PATENT DOCUMENTS 5,274,537 * 12/1993 Altman ................................ 362/353
5,722,758 * 3/1998 Huang .................................... 362/61
6,059,430 * 5/2000 Chen .................................. 362/353
6,086,221 * 7/2000 Wu ...................................... 362/249

* cited by examiner

*Primary Examiner*—Thomas M. Sember
*Assistant Examiner*—Ali Alavi
(74) *Attorney, Agent, or Firm*—Rosenberg, Klein & Lee

(57) ABSTRACT

Disclosed in this present invention is a combo type garden lamp structure that is used as a street lamp or a pendent. By means of an opening formed on the bottom of a light bulb shade in conjunction with a special designed socket, the garden lamp according to the invention can be installed on a lamppost to illuminate an area and used as an illuminating ornament. Moreover, the lamp can be used as a hanging lighting fixture by hanging the light bulb set on the end of electrical wires in an upside-down way. It is not necessary for such a structure to provide an additional opening on the light bulb shade to engage the light bulb shade with a light bulb. Thus it has the advantage of simplified construction.

1 Claim, 7 Drawing Sheets

COMBO TYPE GARDEN LAMP STRUCTURE

BACKGROUND OF THE INVENTION

Conventional garden lamps were used to be supported on a lamp post on the ground as shown in FIGS. 1 and 2. Its structure comprises a light bulb shade (1) with an opening (11) on the bottom thereof as attachment means to secure the light bulb shade to an upright post (2). The lamp post (2) stands on the ground to support a light bulb to illuminate an outdoor area. The light bulb shade (1) must provide another opening (12) on the side wall, through which opening a light bulb set (3) can extend into the interior of the light bulb shade (1) and be secured thereon by resilient clips (31). Such a conventional structure is only suitable for an upright installation. Hence its use is considerably limited. Besides, the opening on the side wall of the light bulb shade provided for an engagement with a light bulb makes production and installation complicated. Thus it is desirable to have improvements made on a prior art garden lamp.

In view of the above problems, the primary object of the invention is to provide a combo type garden lamp that can be installed either in an upright way or by hanging on the ends of electrical wires to enhance its adaptability. Additionally the garden lamp structure of the invention does not need a side wall opening for accommodating light bulbs and so it has the advantages of convenience and simplicity in comparison with a conventional structure.

Now the features and structure of the invention will be described in detail with reference to the accompanying drawings.

BRIEF DESCRIPTION OF THE ACCOMPANYING DRAWINGS

Figure 1:
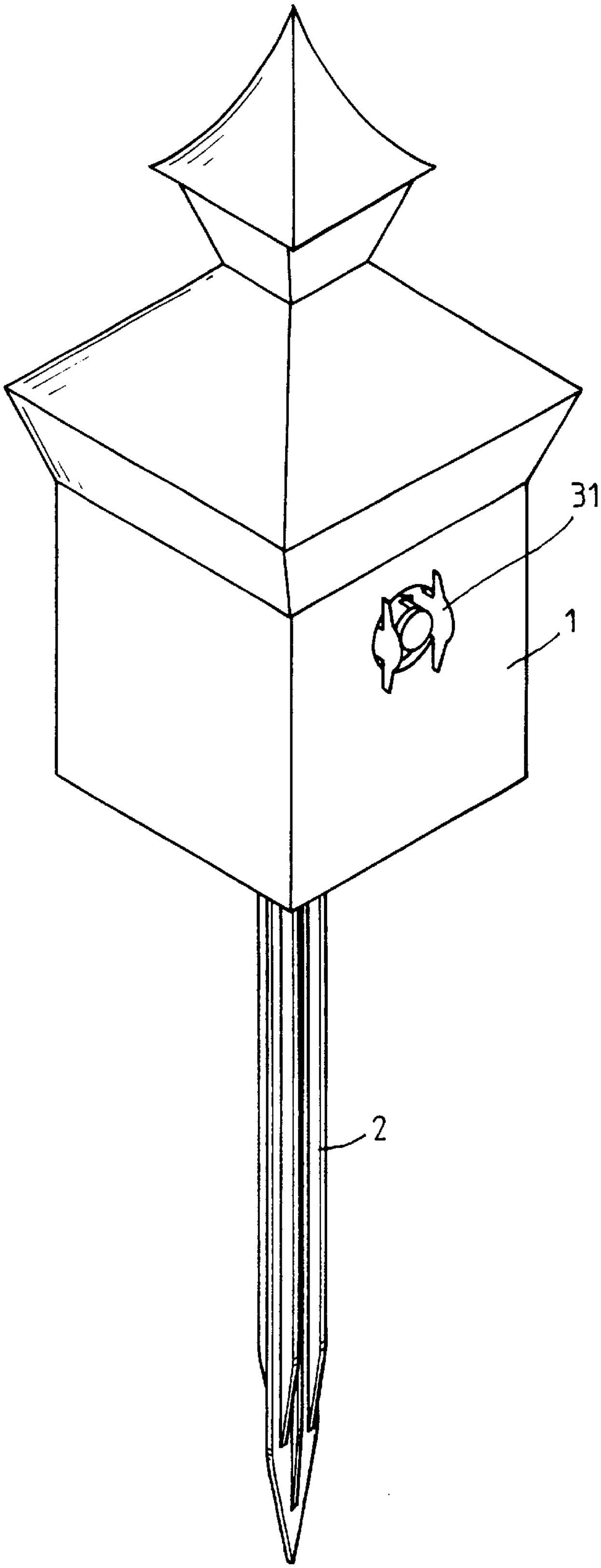
F I G. 1 (prior art)
FIG. 1 is a perspective view of a prior art garden lamp.
Figure 2:
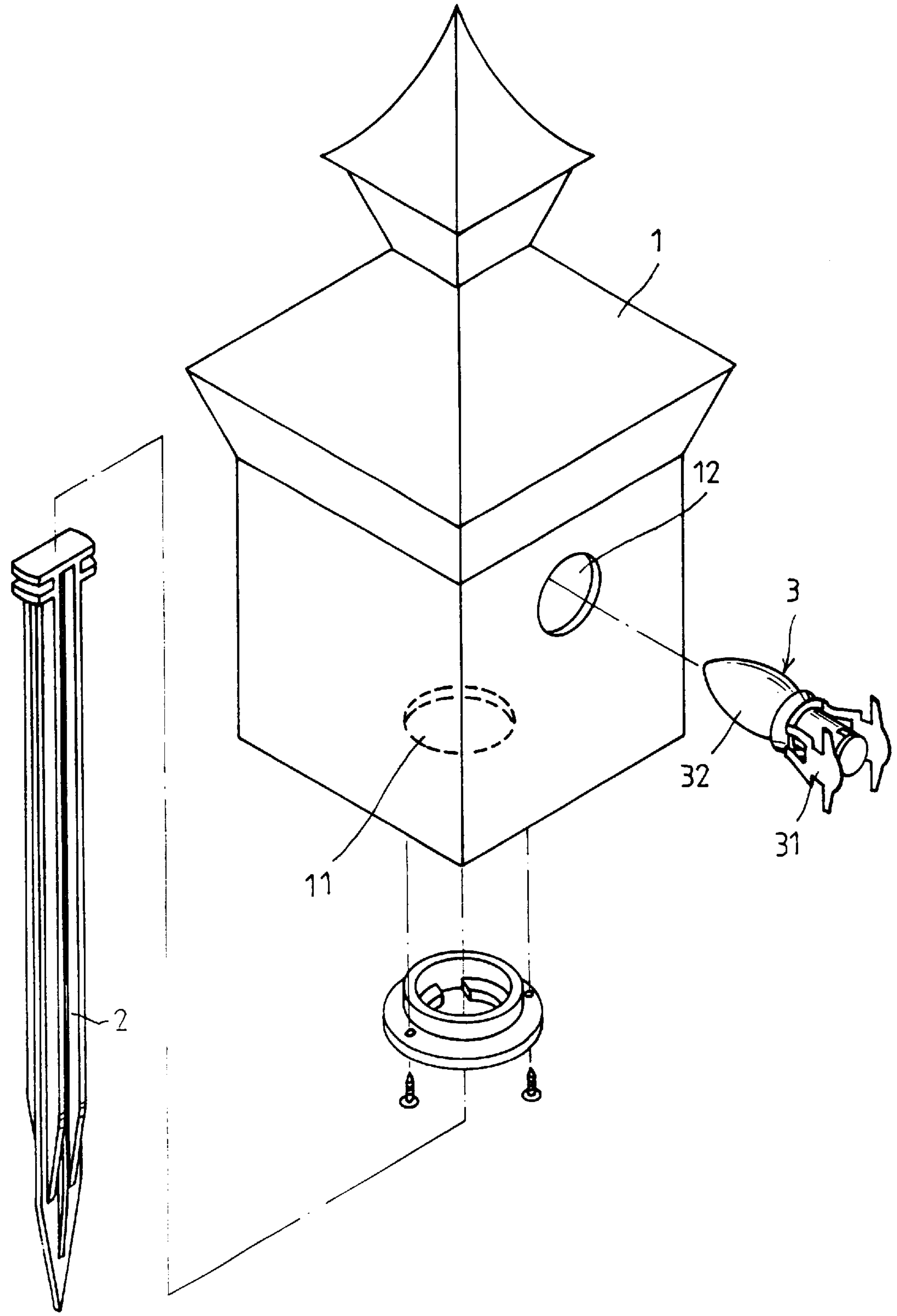
F I G. 2 (prior art)
FIG. 2 is an exploded view of the garden lamp of FIG. 1.
Figure 3:
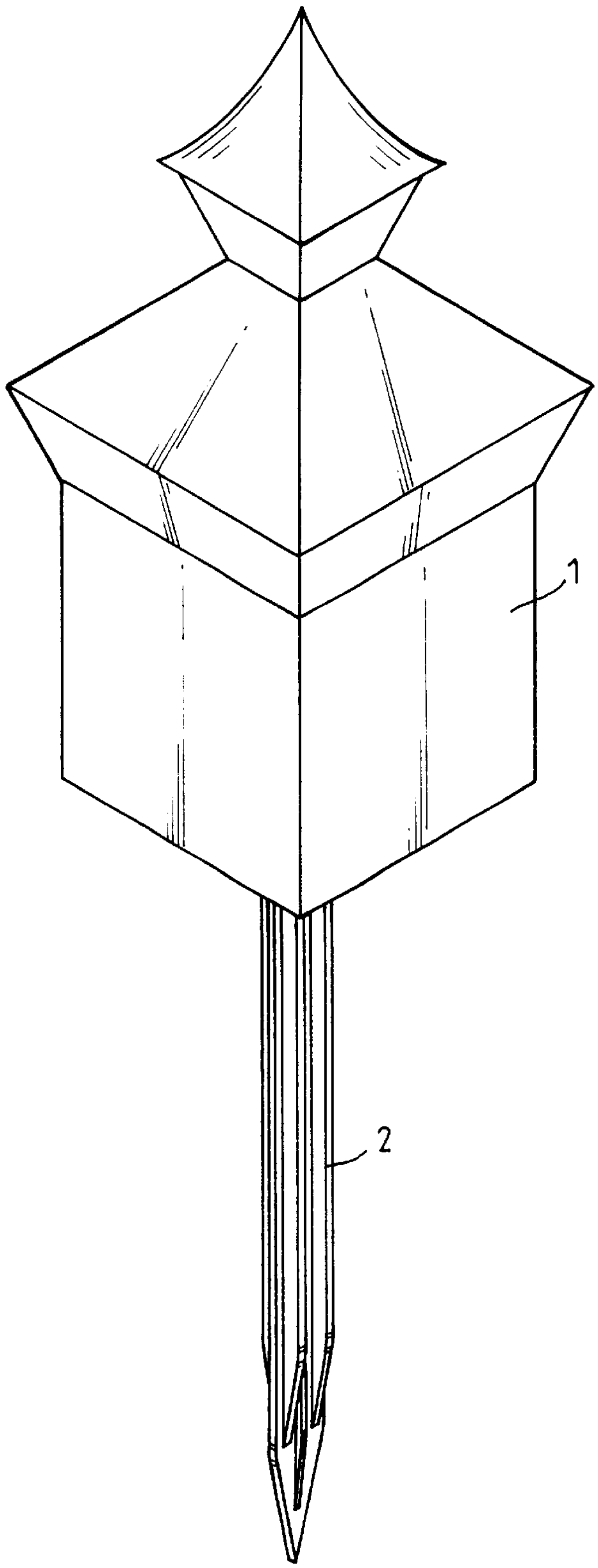

FIG. 3 perspectively shows an embodiment of the garden lamp according to the invention.

Figure 4:
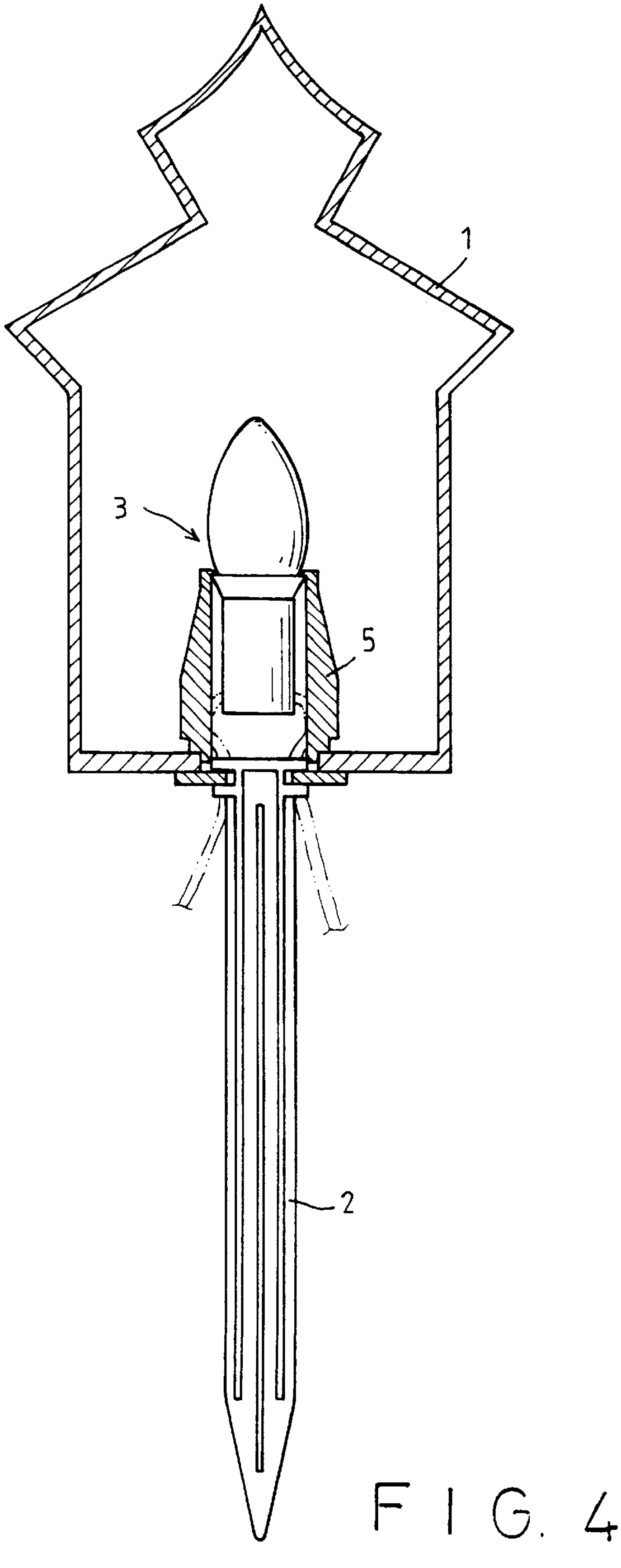

FIG. 4 is a cross sectional view of the garden lamp of FIG. 3.

Figure 5:
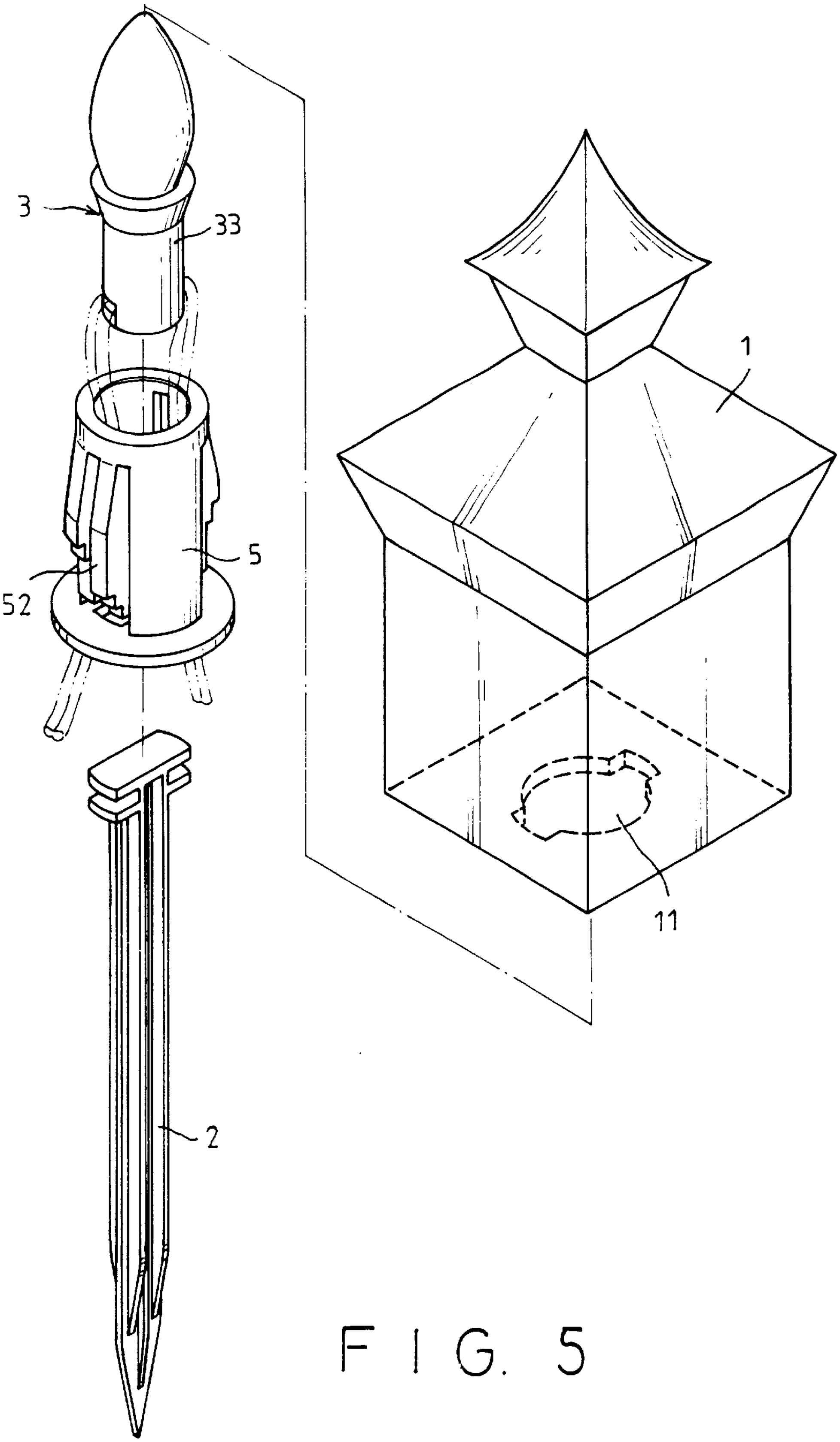

FIG. 5 is an exploded view of the garden lamp of FIG. 3.

Figure 6:
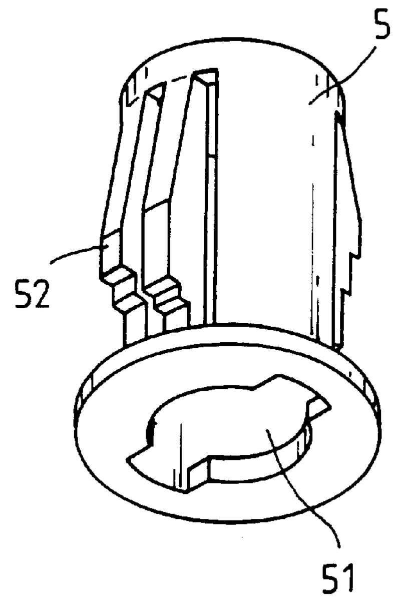

FIG. 6 is a perspective view indicating a light bulb holder according to the invention.

Figure 7:
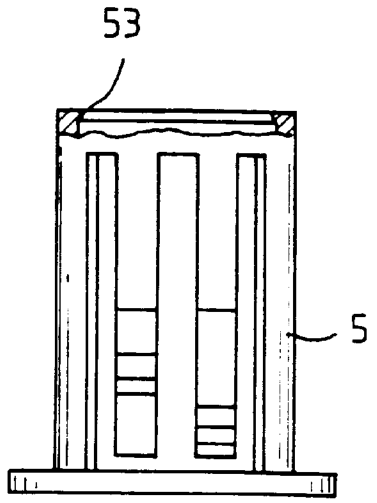

FIG. 7 is a partial cross sectional view of the light bulb holder of the invention.

Figure 8:
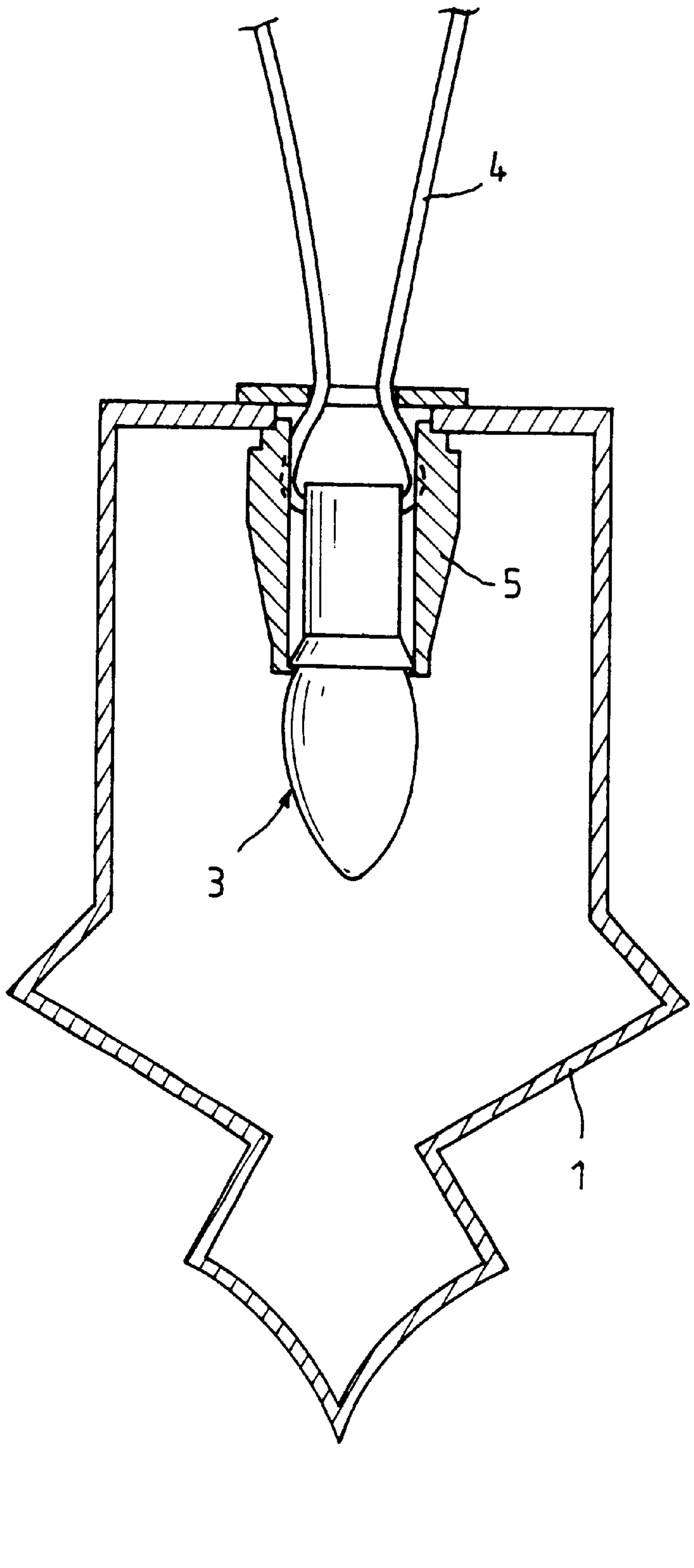

FIG. 8 shows a practical example of using the garden lamp as a pendent according to the invention.

DETAILED DESCRIPTION OF PREFERRED EMBODIMENTS

Referring to FIGS. 2 through 5, the invention comprises a lamp shade (1), a supporting post (2), a light bulb set (3)

and a socket (5). They are suitable to form an upright type garden lamp. The lamp shade (1) is provided with an opening (11) on the bottom. The light bulb set (3) is seated in the socket (5) and then the combination is placed in position by extending it through the opening (11) with two engaging flanges (52) snapped on the bottom wall of the shade (1). The socket (5) is further provided with a hole (51) on the bottom face as shown in FIG. 6, which hole receives a supporting post (2) and is used as connection means of the socket with the supporting post.

As shown in FIG. 7, the socket (5) is provided on the inner wall surface at the open end with a flange (53). When the holder (33) of a light bulb set (3) is inserted into the socket (5), it can be securely locked in position. With such a structure, the garden lamp according to the invention also can be hung on the electrical wires (4) of a light bulb set (3) and used as a pendent to achieve another decoration effect as shown in FIG. 8 if a lamp post is not desirable.

The shape of the above-mentioned shade (1) is just for an illustrative purpose. The present invention is applicable to any other shapes. The primary feature of the invention is that an upright lamp form and a pendent lamp form can be obtained by using the special designed lamp structure. In addition, the integrity of the outer appearance of the outer shade can be maintained since it does not need more holes for a light bulb set. Thus the invention has value in industry.

What is claimed is:

1. A garden lamp structure that can be converted alternately between an upright lamp and a pendant lamp, comprising:

a lamp shade with an opening formed through a bottom face thereof;

a socket adapted for receiving a light bulb set and insertion into said lamp shade through said opening, said socket having engaging flanges on two sides thereof, said flanges being locked in position when said socket is inserted into said lamp shade, said socket having a bottom face with a hole formed therein, said light bulb set including electrical wires selectively providing for suspension of said garden lamp structure as a pendant lamp, said socket having an open end and an internal flange formed adjacent said open end to enable said light bulb set to be grabbed in position; and, a lamp post having an child portion thereof releasably coupled to said socket through said hole to selectively form an upright garden lamp.

* * * * *